Figure 1:
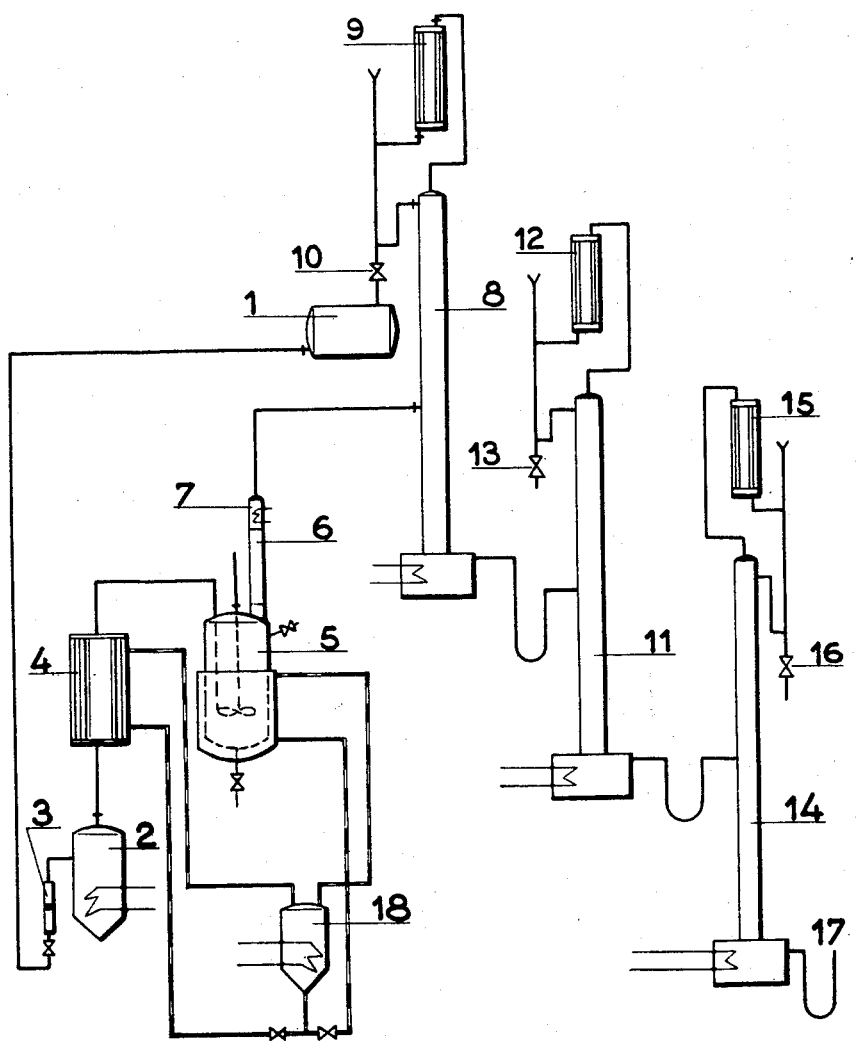

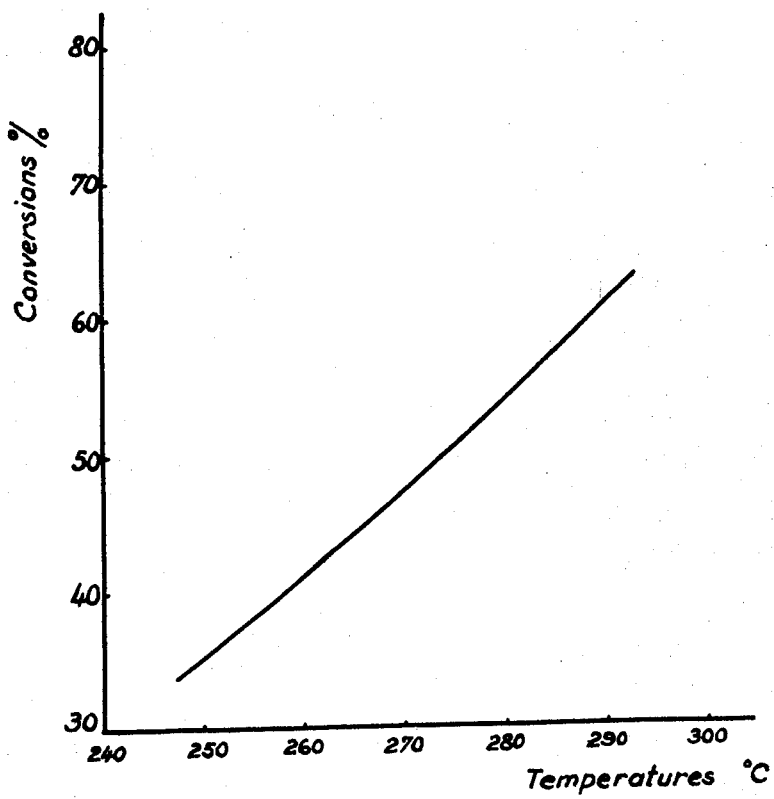

United States Patent Office 3,255,258
Patented June 7, 1966

3,255,258
ISOMERIZATION OF ALKYLENE OXIDES
Ernest Charles, Paris, and Marcel E. Dégeorges and André Thizy, Lyon, France, assignors to Societe Progil, Paris, France, a corporation of France
Filed July 21, 1961, Ser. No. 125,724
Claims priority, application France, July 27, 1960, 40,643; June 5, 1961, 863,888
8 Claims. (Cl. 260—632)

The present invention relates to a process for the isomerization of alkylene oxides into the various other compounds, particularly into the corresponding alcohols.

The alkylene oxides contemplated by the present invention are, in particular, those in which the molecule contains three to ten carbon atoms, particularly those from $C_3$ to $C_5$ inclusive. The novel process applies particularly to those oxides in which the oxygen atom is connected to two adjacent carbon atoms; it is applicable in particular to alkylene oxides which contain the oxygen in the 1-2 position.

Among the compounds which are isomerizable by the process of the invention, the preferred ones are the 1-2 oxides of propene, butene and pentene which can be transformed into the corresponding alkylene alcohols.

The most important industrial case is that of the manufacture of allyl alcohol, i.e. propen-3-ol-1, by isomerization of propene-1,2-oxide (propylene oxide) or

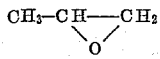

this case has been the subject of considerable work in the past.

It is known that propene oxide can isomerize into propionaldehyde and allyl alcohol in the presence of catalysts at a temperature from 200° to 500° C.

It is also known that certain catalysts direct the isomerization towards the production of allyl alcohol. Trilithium orthophosphate appears particularly effective in this connection. Alumina, silica, chromium oxide and other metallic oxides have also been suggested.

When the exothermic reaction is effected in the vapor phase, a drop in the efficiency of the catalyst rapidly occurs due to the formation of heavy by-products, such as tar, on the catalyst mass. The catalyst can be regenerated however by appropriate treatment, such as calcining or washing with solvents, but it is necessary to avoid any overheating which could destroy its activity. In order to avoid this overheating during regeneration, it has been proposed to dilute trilithium orthophosphate and to use a catalyst containing 70% of the phosphate. Excellent yields are thus obtained in the isomerization into allyl alcohol, but the operative cycles between the two successive regenerations remain relatively short, of the order of 80 hours, with a progressive drop in the yield of the transformation during the course of each cycle.

The present invention allows the technique of isomerization of the prior art to be simplified and improved by the application of a novel process which consists in passing the alkylene oxide in the gaseous state through a suspension of solid pulverulent catalyst in a chemically inert auxiliary liquid at the isomerization temperature, generally of the order of 180° to 400° C.

An object of the present invention is to provide various advantages over the known techniques which operate in the gaseous phase on fixed, solid catalyst masses, or fluidized pulverulent catalysts.

One of the objects of the invention is to provide a process in which the catalyst does not require to be specially granulated.

Another object is to facilitate the handling of the catalyst, in charging and emptying the apparatus used, and employing the catalyst in the form of a liquid suspension.

A further object of the invention is to allow the isomerization to be carried out in a simplified apparatus, such as a reaction vessel of simple shape, in place of bundle of tubes or a fluid catalyst apparatus comprising several cyclones.

Another object consists in automatically avoiding local overheating and more readily adjusting to the temperature of the reaction.

The invention also has the object of eliminating the heavy impurities which can form during the reaction. The impurities remain in solution in the auxiliary liquid used and after separation of the catalyst, for example by filtration, decantation of centrifuging, the auxiliary liquid can be subjected to regeneration, by distillation for example, in order to separate the impurities. This operation can be effected continuously or discontinuously on the while of or only part of the auxiliary liquid. The usual operations of grinding the catalyst, which are extensive and delicate, are thus avoided and an improved utilization of the reactor is thus obtained.

A further important object of the invention is to considerably increase the effective life of the catalyst. A suspension according to the invention can serve for more than 500 hours and, under certain conditions, for up to 1000 hours, before regeneration of the catalyst becomes necessary.

A further object is to provide a process giving high yields. In particular, in the case of isomerization of propene oxide, more than 1 kg. and even several kilograms of allyl alcohol can be produced per kilogram of catalyst per hour.

A very important object of the invention is a process for the manufacture of allyl alcohol in which conversions of 30 to 70% can be obtained at each passage of the propene oxide, with a yield in allyl alcohol of more than 90%, while very reduced proportions of propionaldehyde and acetone are formed.

A further object of the invention is the isomerization of alkylene oxides into aldehydes and/or ketones, in the presence of specific catalysts known for such reactions, for example, halides, oxyhalides or sulphates of alkaline earth metals or earth metals.

The principal operations of the process of the invention comprise preparation of a mixture of catalyst powder with the auxiliary liquid selected, vaporization of the alkylene oxide, introduction of this oxide into the liquid catalyst suspension maintained at a suitable temperature and condensation of the vapors thus formed.

Generally, the alkylene oxide vapor is preheated to the vicinity of the reaction temperature and the heat of reaction is eliminated by known means through the walls of the reactor containing the suspension. However, adjustment of the temperature can be effected by the direct introduction of liquid alkylene oxide in whole or in part into the suspension. According to a modification of the process, the auxiliary liquid is constituted by or contains a liquid having a boiling point equal to or slightly greater than the temperature of isomerization; vaporization of this liquid absorbs the heat due to the exothermic reaction. The fraction of liquid thus entrained by the reaction products is recycled, after condensation and separation of such products.

The reactor can be constituted by a receptacle such as, for example, a vessel or tower. There can thus be utilized a vessel provided with a mechanical agitator. Agitation can be caused simply by bubbling the alkylene oxide vapors into a receptacle of high shape or the oxide vapors can, if desired, pass through a plate column or stack through which the catalyst suspension in the auxiliary liquid is flowing. Any other known means can also be utilized for contacting the alkylene oxide with the catalyst, with the maximum yield.

The auxiliary liquid employed has no chemical action with respect to propene oxide or allyl alcohol. Its stability to heat is such that practically no decomposition occurs at least up to 300° C. Preferably, liquids which do not undergo alteration at temperatures above 300°, namely from 300° to 450° C., are used.

The auxiliary liquids according to the invention are otherwise characterized by boiling points above 150° C., preferably above 300° C., so that isomerization could be effected at atmospheric pressure.

The process can be effected with a liquid having a solidification point slightly below the temperature selected for the reaction. If required, substances melting up to 350° C. can thus be utilized. It is preferably, however, for the temperature of solidification of the auxiliary liquid to be below 250° C. and preferably below 200° C.

The liquids which are particularly advantageous are those which, while having high boiling points, become solid at sufficiently as low temperatures as possible, particularly below 100° C. It is convenient to be able to operate and, in particular, to prepare liquid suspensions of the catalyst powder, at not too high a temperature, relatively close to the ambient temperature. This advantageous condition can be realized by mixing products of different melting points.

Another characteristic which the auxiliary liquids employed preferably have is a low viscosity. It is advantageous to employ liquids having a viscosity, at the ambient temperature, which does not generally exceed 100 centipoises and it is important that above 180° C., namely at isomerization temperatures, the viscosity should be below 2 and preferably below 1 centipoise.

In selecting the auxiliary liquids, it is advisable to give preference to those which best dissolve the heavy by-products which are generally formed in the isomerization step. It is known that these materials, if they impregnate catalyst, greatly reduce the useful life thereof. The disadvantage is overcome or at least considerably reduced in the process of the invention by the use of liquids which dissolve the heavy by-products.

The auxiliary liquids corresponding to the various characteristics mentioned above are found particularly among aromatic, cycloalkyl, cycloalkenyl and aliphatic hydrocarbons having molecular weights above 120, including aryl oxides.

Various compounds which are suitable for the new process are indicated below by way of example.

The aryl, alkyl and aralkyl benzenes are particularly suitable. Among this group, there can be mentioned, in particular, phenyl-benzene or diphenyl, ortho-, meta- and para-diphenyl-benzene (terphenyls), isomers of triphenyl-benzene (quaterphenyls), in particular, 1,3,5-triphenyl-benzene melting at 172° C., para-para-quaterphenyl and other polyphenyls.

The terphenyls constitute a particularly advantageous example, because they have sufficiently high boiling points, sufficiently low viscosities in the cold, dissolve tarry materials and can be used in the form of mixtures below 100° C., namely below 50° C. or even at 29° C. There are for this purpose:

Ortho-diphenyl-benzene, melting at 56° C. and boiling at 332° C.;
Meta-diphenyl-benzene, melting at 86° C. and boiling at 363° C.;
Para-diphenyl-benzene, melting at 213° C. and boiling at 376° C.

By employing mixtures of 60 to 80% of ortho, 20 to 35% of meta and 0 to 3% of para, crystallization can commence below 50° C. The ortho+meta eutectic melts at 29° C.

The various aralkyl-benzene isomers utilizable according to the invention can be represented by the formulae:

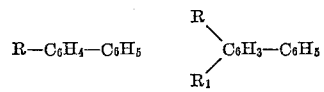

and

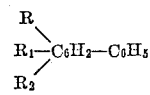

in which R, $R_1$ and $R_2$ are alkyl radicals such as methyl, ethyl, propyl, isopropyl, butyl, isobutyl, pentyl and hexyl.

As with the polyphenyls indicated above, their alkylated derivatives having alkyl groups in all the aromatic nuclei, namely the aralkyl-alkyl benzenes are useful in carrying out the process. Their formulae can be illustrated by the following:

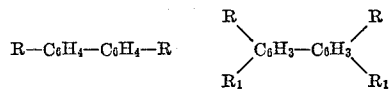

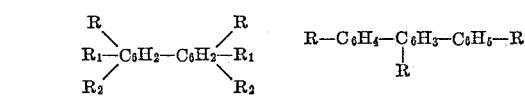

etc., in which R, $R_1$ and $R_2$ are alkyl radicals, preferably having less than 13 carbon atoms. Within this group, are, for example, bis-(methyl-benzene) or ditolyl, bis-(dimethyl-benzenes) or dixylyls, the tertolyls, terxylyls, etc.

Alkyl benzenes of molecular weights slightly above 120, such as propyl, isopropyl, butyl, dimethyl and other benzenes, can be employed when the isomerization is effected under more or less elevated pressure. At atmospheric pressure, heavy alkyl benzenes are suitable, particularly those of which at least one alkyl radical is constituted by a long aliphatic chain, for example of 6 to 30 carbon atoms. There can thus be employed with success mono- and didodecylbenzenes, tridecylbenzenes, hexadecylbenzenes, nonadecylbenzenes, eicosylbenzenes, octadecylbenzenes, and so on. One or more of the alkyl radicals can be lower, namely from 1 to 6 carbon atoms, such as is the case with propyldodecylbenzene, $$CH_3—CH_2—CH_2—C_6H_4—(CH_2)_{11}—CH_3$$

or hexyldodecyl benzene, $$CH_3—(CH_2)_5—C_6H_4—(CH_2)_{11}—CH_3$$

The high molecular weight alkylbenzene auxiliary liquids mentioned above are generally mixtures of materials in which the benzene ring has aliphatic side chains of variable lengths from $C_{12}$ to $C_{30}$, and of materials in which the benzene ring also carries one or more alkyl radicals ranging up to 6 carbon atoms.

These liquids frequently also contain polyaryl alkyls in which the alkyl group can have from 1 to 8 carbon atoms.

These include in particular diphenyl-methane, triphenyl-methane, diphenyl-pentane, triphenyl-hexane. Such poly-aryl alkyls can also be used independently of the alkyl benzenes referred to above.

As for cyclo-aryl hydrocarbons, there can be used mono- or polyphenyl-cyclohexane, toluyl-cyclohexanes and so on.

As regards aryl cyclenic compounds, apart from the phenyl, toluyl or xylyl cyclohexanes, there is also a series of materials which are derived from the aryl and alkyl benzenes described above by partial hydrogenation, namely by saturation of some of the double bonds of the aromatic nucleus. Such products, which are very suitable for the process of the invention, are in particular partially hydrogenated polyphenyls, particularly diphenyls, terphenyls and quaterphenyls, which contain, for example, not more than 1 to 5 double bonds out of 6.

It is to be understood that the aromatic compounds utilizable as auxiliary liquids can contain nuclei other than the benzene nucleus, particularly the naphthalene, anthracene, indene, phenanthrene or other nuclei.

When aliphatic hydrocarbons are used as the auxiliary liquids in the process of the invention, the higher molecular weight materials such as nonanes, for example, decanes, dodecane, eicosanes, etc., are selected. In practice, use is made of industrial mixtures known under the names of vaselines and paraffins. Squalane of composition $C_{30}H_{62}$ (triacontane) boiling at 335° C. is also suitable, as well as fish oils and various greases hydrogenated to saturation.

Aryl oxides of the general formula $(C_6H_5—O—)_n$ (where $n$ is more than 1, that means a molecular weight greater than 93 and in fact at least 170) alone or in admixture with other compounds mentioned, are suitable as auxiliary liquids. There can be employed in particular diphenyl oxides, bis-(paraphenyl)-phenyl ether, meta-bis (metaphenoxy)-phenoxy benzene and so on.

According to the activity of the catalyst employed, the transformation yield per passage desired, the nature of the auxilairy liquid, the pressure and, if required, other conditions, the temperature of the liquid suspension of the catalyst can vary from 180° to 400° C. during the isomerization. In general, it is preferable to operate between 250° and 350° C. because below these limits the reaction is slow, while above them the proportion of secondary products becomes considerable. When the isomerization is efected under atmospheric pressure, the temperature range is preferably 270° to 310° C.

In the case where the catalyst is constituted by lithium orthophosphate, it is particularly advantageous to operate between 225° and 300° C.

Since the transformation

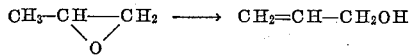

is slightly exothermic, the reaction medium does not require to be heated from the time when it has reached the temperature of operation. It is then sufficient to provide thermal exchange with the exterior in order to maintain the medium at the desired temperature. The latter is not necessarily constant and there can be advantage in allowing it to vary between appropriate limits throughout the duration of the isomerization. In order to ensure constancy of the transformation yield, the operation can commence wish fresh catalyst at 275° C., for example, and then the temperature is allowed to rise slowly at a rate proportional to the decrease in activity of the catalyst. The latter is regenerated when it does not act properly at 305° C., for example.

The process according to the invention can be carried out with various solid catalysts, particularly with those which have been used up to the present for standard isomerization, by the passage of gaseous propylene oxide through a catalyst bed selected according to the type of isomerization desired, namely into an alcohol, an aldehyde and/or a ketone. There can thus be employed the oxides of aluminium, iron, chromium, nickel, cobalt, molybdenum, cerium, tin, uranium, thorium, and silicon. Carbon in porous form and carbides such as those of boron are also utilizable. As in the known process, particularly favourable results are obtained, in the case of the isomerization into allyl alcohol, with catalysts based on trilithium orthophosphate, $Li_3PO_4$. However, at the same time temperature for the same contact time, this catalyst leads to rtnasformation yields which are higher and to improved yields when it is employed in suspension in an auxiliary liquid according to the invention and also the lift catalyst is considerable extended.

In the novel process, the catalyst can be employed in the form of a powder of particles of variable sizes, preferably as fine as possible. While particles the largest dimension of which is, for example, of from 0.1 to 250 microns can be employed, it is preferable, however, for this dimension not to exceed ten microns. In practice, powders of 0.5 to 5 microns are particularly suitable.

The proportion of powder put into suspension in the auxiliary liquid should be substantial, but should not attain that at which the suspension ceases to be sufficiently fluid. In fact, it is necessary for the gaseous propylene oxide to be able to become distributed in fine bubbles and thus pass through the liquid suspension. In general, the proportion of catalyst lies between 5 and 40% by weight of the suspension, preferably 10 to 25%. In the case of trilithium orthophosphate of 1 to 2 microns particle size, high transformation yields are obtained from 15% and they vary little for higher proportions.

The contact times for the propylene oxide with the catalyst suspension can vary over wide limits according to the particular conditions of preparation employed, but generally are of the order of 1 to 100 seconds, preferably 3 to 20 seconds.

Although the process of the invention can be suitably carried out under atmospheric pressure, measured at the start of suspension of the catalyst, it can be advantageous, particularly to increase the isomerization yields, to operate under elevated pressure. In principle, the absolute pressure over the suspension can rise to the vapour pressure of allyl alcohol at 300° C., namely around 100 atms. However, for practical reasons, it is not necessary to employ such high pressures, because very favorable results are obtained with 2 to 25 atms. or even with 2 to 8 atms.

The choice of the pressure is also governed by the nature of the auxiliary liquid. It is of interest to increase the pressure if it is desired to work with a liquid boiling a little too low, namely a liquid which is only slightly viscous, because viscosities normally increase with boiling points. For example, diphenyl oxide, which melts at 26.9° C. and boils at 258° C. under 760 mm. Hg, can be used as the auxiliary liquid alone below or at 258° C., if operating under atmospheric pressure. As its vapor pressure is 16 atms. at 280° C., it is possible to effect the isomerization within this liquid, at 280° C., by operating under a pressure above 16 atms. The pressure corresponding to 300° C. will be 24 atms.

FIG. 1 of the accompanying drawing shows by way of example an embodiment of apparatus for carrying out the invention with separation of the constituents on a continuous basis.

Propylene oxide stored in a reservoir 1 is vaporized in a heater 2. Adjustment of the supply is effected by means of a flowmeter 3. The propylene oxide vapors pass through a preheater 4 and into a reaction vessel 5 at a temperature such that the temperature of auxiliary liquid contained in 5 is maintained at its optimum value. An exchanger 18 allows the preheater 4 to be supplied and the temperature in the reactor 5 to be adjusted.

A small column 6 surmounts the vessel 5; it serves to reflux the auxiliary liquid entrained, by suitable adjustment of a reflux condenser 7. From time to time, a little liquid is withdrawn from the vessel 5 by the lower valve. This is filtered to separate the catalyst which can be reintroduced as such or after being subjected to washing or other suitable treatment for regeneration. If desired, the filtrate is distilled to regenerate the auxiliary liquid. The vapors containing allyl alcohol, propylene oxide in excess and impurities pass to a column 8. The propylene oxide collects at the head and by opening the valve 10, it is returned to 1. The liquid deprived of propylene oxide flows into the column 11. The valve 13 is used to recover the light impurities, such as acetone and propionaldehyde. At the bottom of the column 11, allyl alcohol is obtained contaminated with a small quantity of heavy impurities, which are separated in the column 14 and run off at 17. The allyl alcohol is withdrawn by a valve 16.

To simplify the drawing, the control apparatus and usual regulation apparatus, which allow automatic operations to be carried out, have not been shown.

A modification of the apparatus includes a tower or column, several metres in height, in place of the vessel 5.

In order that the invention may be readily understood, the following examples are given by way of illustration.

*Example 1*

Into a vertical tower of 5 m. height and 1 m. internal diameter, 1000 kg. of a mixture of alkyl-benzenes containing mono- and dialkyl-benzenes, the radicals being constituted by aliphatic chains from $C_{12}$ to $C_{20}$, predominantly mono- and di-dodecyl-benzenes, were introduced. This mixture also contained hexyl-dodecyl-benzene and its boiling temperature was 300° to 350° C. It had a rapidly decreasing viscosity with temperature, namely:

331 centipoises at 0° C.
122 centipoises at 10° C.
50 centipoises at 25° C.
0.9 centipoises at 200° C.

In the liquid, 250 kg. of catalyst were dispersed, constituted by lithium orthophosphate in very fine powder form, the particles having an average diameter of 1–2 microns.

The liquid was maintained at 280° C. while gaseous propene-1,2-oxide, preheated to 250° C., was passed in through dip tubes passing to the bottom of the tower. The amount of gas was 875 kg./h. and was sufficient to agitate the liquid suspension of solid catalyst, which formed a bed 1.90 m. high in the tower. The gas leaving the reactor contained 36% allyl alcohol, 1.6% propionaldehyde and 0.8% acetone. The chemical yield of allyl alcohol with respect to propene-1,2-oxide consumed was 92%.

*Example 2*

In the same tower as in Example 1, operation occurred under similar conditions, but the quantity of liquid was 1400 kg., that of the catalyst was 350 kg., the height of the suspension, 2.7 m., and the amount of propene-1,2-oxide was 750 kg./h. 50% of allyl alcohol, 2.5% propionaldehyde and 1.5% acetone were obtained in the effluent vapors and the yield of allyl alcohol was 91%. The activity of the catalyst began to decrease only after 600 hours of operation.

*Example 3*

By operating as in Example 2, but with an input of 1250 kg. of propene-1,2-oxide per hour, an isomerization yield into allyl alcohol of 40% was obtained, with 1.3% propionaldehyde and 0.7% acetone. The yield was 93% of allyl alcohol.

*Example 4*

The conditions of Example 3 were modified only in that the temperature was maintained at 300° C. instead of 280° C. 60% allyl alcohol was obtained with a yield of 91%.

*Example 5*

In a tube 20 cm. in diameter and 4 m. high, 45 kg. of allyl benzenes and 15 kg. of the same catalyst as in the foregoing examples was introduced. By maintaining the temperature of the catalyst liquid suspension at 230° C., propylene oxide was passed in at a rate of 6 kg./h. The effluent vapor contained 10% of allyl alcohol and a trace of aldehyde and acetone. The activity of the catalyst only decreased substantially after 1200 hours of operation.

*Example 6*

In the tower of Example 1, at 280° C., a suspension of 350 kg. trilithium orthophosphate having particles of 1–2 microns in 1400 kg. of a mixture of ortho, meta and para-terphenyls melting at 45° C. was used.

The suspension formed a layer 2 m. high. Propylene oxide was passed through in an amount of 200 kg./h. 900 kg. of allyl alcohol per hour were produced, namely a conversion rate of 45% with a yield of 92%. The aldehyde and acetone contents were respectively 2% and 1%.

*Example 7*

Operation was as in Example 6, but the temperature was 275° C. under absolute pressure of 2 atms., with a propylene oxide input of 400 kg./h. The rate of transformation into allyl alcohol was 55% and the yield 90%.

*Example 8*

The conditions of pressure, namely 2 atms., were the same as in Example 7 for a temperature of 300° C. and an input of 875 kg./h., which produced a formation of 55% allyl alcohol.

*Example 9*

Into the vessel shown at 5 in the drawing, having a capacity of 2000 l., 1000 kg. of squalane, namely the aliphatic hydrocarbon, $C_{30}H_{62}$ (triacontane), and 500 kg. trilithium orthophosphate in extremely fine powder form were introduced. While continually rotating the agitator, the contents of the vessel were supplied with 300 kg. per hour of propylene oxide from the reservoir 1. The heater 2 and the preheater 4 were adjusted so that the suspension of phosphate in the squalane was maintained at a constant temperature of 280° C.

The effluent vapours contained 46% allyl alcohol, about 4% acetone and aldehyde, the balance being substantially non-isomerized propylene oxide. The yield of allyl alcohol with respect to the oxide transformed was 92%.

*Example 10*

Through a suspension of 35% by weight of a very fine powder of trilithium orthophosphate in propyl-dodecyl-benzene, a stream of propylene oxide 1-2 is bubbled at the rate of 340 grams per hour per liter of the suspension. The operation is repeated at various temperatures and the conversion ratios percent of propylene oxide to allyl alcohol are plotted on the diagram represented on FIG. 2 of the drawing.

*Example 11*

Through a suspension of 17% by weight of a very fine powder of trilithium orthophosphate in disphenyl oxide, a stream of propylene oxide 1-2 is bubbled at the rate of 340 grams per hour per liter of the suspensions. The latter is kept at 275° C., under a pressure of 16 atms. The conversion of propylene oxide into allylic alcohol is 57%.

*Examples 12 to 19*

Through a suspension of 20% by weight of a very fine powder (1 to 10 microns) of trilithium orthophosphate in an auxiliary liquid, a stream of propylene oxide 1-2 is bubbled at the rate of 340 grams per hour per liter of the suspension.

The following conversions to allylic alcohol are obtained:

| Example No. | Auxiliary liquid and its boiling point | Isomerisation Temperature in °C. | Conversion percent |
|---|---|---|---|
| 12 | Cyclohexyl-benzene; 239° | 220 | 17 |
| 13 | Dimethyl 1-6 naphthalene; 265° | 250 | 36 |
| 14 | Distolyl; 273° | 265 | 45 |
| 15 | Hexyl dodecyl benzene; 300° | 285 | 58 |
| 16 | Triphenyl-methane; 358° | 290 | 62 |
| 17 | Meta-bis (metaphenoxy)-phenoxy benzene. | 290 | 62 |
| 18 | Anthracene; 340° | 315 | 73 |
| 19 | Pyrene; 393° | 350 | 78 |

*Example 20*

In order to prepare butenol the propylene oxide of Example 14 is replaced by butylene oxide blown at the rate of 435 grams per hour per litre of the suspension.

*Example 21*

Pentenols are obtained as in Example 15, the propylene oxide being substituted with amylene oxide at the rate of 527 grams per hour per liter of suspension.

*Example 22*

In Example 16 heptene oxide 1–2 is used instead of propylene oxide.

*Example 23*

In didodecyl-benzene 22% by weight of a very fine powder of chromic oxide $Cr_2O_3$ are suspended. The chromic oxide is prepared as explained in U.S.P 2,479,632. The suspension is kept at 330° C. while propylene oxide, preheated to 250° C., is bubbled therein at the rate of 370 grams per hour per liter of suspension. The vapour thus obtained contains 27% of allylic alcohol and 8% of propionaldehyde.

*Example 24*

Propionaldehyde is prepared in passing propylene oxide through a suspension of 27% by weight of a fine powder anhydrous barium oxybromide in para-para-quaterphenyl at 305° C. at the rate of 100 grams per hour per liter of suspension. The conversion into propionaldehyde is 62% while 17% acetone are formed.

*Example 25*

Hexylaldehyde is obtained in a manner similar to that of Example 24, propylene oxide being replaced by hexene oxide.

*Example 26*

Normal butyraldehyde and isobutyraldehyde are prepared in the presence of a catalyst constituted by 95 parts by weight of cereous sulfate, previously heated at 300° C., and 5 parts of barium hydroxide. 300 grams of fine powder of catalyst are dispersed in 1 kg. of spermaceti which has been hydrogenated to saturation. The suspension is heated between 245° and 255° C. and a gaseous stream of butene oxide is passed through the suspension. The butene oxide contains 50% of isobutene oxide, and 50% of butene 1–2 and butene 2–3 oxides. The stream flows at the rate of 150 grams per hour per liter of suspension. 54% of isobutyraldehyde and n-butyraldehyde are obtained, the balance being mainly composed of methyl-ethyl-ketone and a little quantity of butenols.

*Example 27*

A powder, having a fineness of 2 to 6 microns, of magnesium pyrophosphate activated with copper, as described in U.S.P. 2,031,200, is dispersed in commercial di-isopropylbenzene. A stream of ethylene oxide, at the rate of 100 grams per hour per liter of liquid, is passed through the suspension at 190° C. About 80% of acetaldehyde are obtained.

We claim:

1. A process for the production of allyl alcohol by heating gaseous 1,2-propylene oxide in contact with trilithium phosphate, which comprises passing the propylene oxide through a suspension of fine particles of trilithium phosphate in an auxiliary liquid maintained at a temperature of from 180° C. to 400° C., said liquid being selected from the group consisting of aromatic hydrocarbons, saturated aliphatic hydrocarbons and aryl oxides and having a molecular weight above 120, a boiling point at least equal to the temperature of the suspension, a viscosity of less than 2 cps. at 180° C., and being so stable as to avoid substantial decomposition at the temperature of the suspension, at least a major part of said auxiliary liquid being maintained in the liquid state during passage of the propylene oxide therethrough.

2. The process as defined in claim 1, which said auxiliary liquid is an aliphatic hydrocarbon.

3. The process as defined in claim 1, in which said auxiliary liquid is diphenyl oxide.

4. The process as defined in claim 1, in which said auxiliary liquid is an aromatic hydrocarbon including a phenyl group substituted by a hydrocarbon radical.

5. The process as defined in claim 1, in which the maximum dimension of the trilithium phosphate particles is from 0.1 to 250 microns and in which said particles comprise from 5% to 40% by weight of said suspension.

6. A process for the production of allyl alcohol by heating 1,2-propylene oxide in the vapor phase in contact with trilithium phosphate, which comprises bubbling the propylene oxide vapor through a suspension of from 5% to 40% by weight of fine particles of trilithium phosphate having their maximum dimensions ranging from 0.1 to 10 microns, in an auxiliary liquid constituted of an alkyl benzene in which at least one alkyl radical having from 6 to 30 carbon atoms is linked to the benzene ring, said auxiliary liquid having a molecular weight above 120, a boiling point at least equal to the temperature of the suspension, a viscosity of less than 2 cps. at 180° C. and a stability such that it is substantially free from decomposition products at 180° C.; and maintaining the suspension, with at least a major portion of said auxiliary liquid in the liquid state, at a temperature of from 225° C. to 300° C., concurrently with the passage of the propylene oxide therethrough.

7. A process for the production of allyl alcohol by heating 1,2-propylene oxide in the vapor phase in contact with trilithium phosphate, which comprises bubbling the propylene oxide vapor through a suspension of from 5% to 40% by weight of fine particles of trilithium phosphate having their maximum dimensions ranging from 0.1 to 10 microns, in an auxiliary liquid constituted of an aryl benzene in which at least one hydrogen atom of the benzene nucleus is substituted by an alkyl group having from one to eight carbon atoms, said auxiliary liquid having a molecular weight about 120, a boiling point at least equal to the temperature of the suspension, a viscosity of less than 2 cps. at 180° C., and a stability such that it is substantially free from decomposition products at 180° C.; and maintaining the suspension, with at least a major portion of said auxiliary liquid in the liquid state, at a temperature of from 225° to 300° C., concurrently with the passage of the propylene oxide therethrough.

8. A process for the production of allyl alcohol by heating 1,2-propylene oxide in the vapor phase in contact with trilithium phosphate, which comprises bubbling the propylene oxide vapor through a suspension of from 5% to 40% by weight of fine particles of trilithium phosphate having their maximum dimensions ranging from 0.1 to 10 microns, in an auxiliary liquid constituted of a polyphenyl selected from the group consisting of diphenyl, terphenyls and quaterphenyls, said auxiliary liquid having a molecular weight above 120, a boiling point at least equal to the temperature of the suspension, a viscosity of less than 2 cps. at 180° C., and a stability such that it is substantially free from decomposition products at 180° C.; and maintaining the suspension, with at least a major portion of said auxiliary liquid in the liquid state, at a temperature of from 225° to 300° C., concurrently with the passage of the propylene oxide therethrough.

References Cited by the Examiner

UNITED STATES PATENTS

| | | | |
|---|---|---|---|
| 2,159,507 | 5/1939 | Law et al. | 260—632 X |
| 2,426,264 | 8/1947 | Fowler et al. | 260—632 |
| 2,479,632 | 8/1949 | Lundsted et al. | 260—632 |
| 3,090,815 | 5/1963 | Denton | 260—632 |
| 3,092,668 | 6/1963 | Bruson et al. | 260—632 |

OTHER REFERENCES

Vener: "Chemical Engineering," July 1955, pp. 204–5.

LEON ZITVER, *Primary Examiner.*

CHARLES B. PARKER, *Examiner.*

A. H. SUTTO, M. B. ROBERTO, J. E. EVANS,
*Assistant Examiners.*